United States Patent
Zhang et al.

(10) Patent No.: US 9,031,393 B2
(45) Date of Patent: May 12, 2015

(54) METHODS FOR ENHANCING CAMERA FOCUSING PERFORMANCE USING CAMERA ORIENTATION

(71) Applicant: NVIDIA Corporation, Santa Clara, CA (US)

(72) Inventors: Guanghua Gary Zhang, Sunnyvale, CA (US); Katharine Ip, Mountain View, CA (US); Michael Lin, Fremont, CA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 13/916,371

(22) Filed: Jun. 12, 2013

(65) Prior Publication Data

US 2014/0368724 A1    Dec. 18, 2014

(51) Int. Cl.
*G03B 13/36* (2006.01)
*H04N 5/232* (2006.01)

(52) U.S. Cl.
CPC .............. *G03B 13/36* (2013.01); *H04N 5/232* (2013.01)

(58) Field of Classification Search
USPC .................................... 396/50, 103, 125, 133
See application file for complete search history.

(56) References Cited

U.S. PATENT DOCUMENTS

| | | |
|---|---|---|
| 5,075,777 A | 12/1991 | Murata |
| 5,838,374 A | 11/1998 | Kikuchi |
| 5,847,874 A | 12/1998 | Sasao et al. |
| 6,130,417 A | 10/2000 | Hashimoto |
| 6,456,737 B1 | 9/2002 | Woodfill et al. |
| 7,020,783 B2 | 3/2006 | Vange et al. |
| 7,236,470 B1 | 6/2007 | Bims |
| 7,309,932 B2 | 12/2007 | Tseng |
| 7,574,016 B2 | 8/2009 | Steinberg et al. |

(Continued)

FOREIGN PATENT DOCUMENTS

| | | |
|---|---|---|
| EP | 1953903 | 8/2008 |
| WO | 2013078045 | 5/2013 |

(Continued)

OTHER PUBLICATIONS

Pierpaolo Baccichet, "H.264/AVC compliant solutions for Slep-based error robustness and for video surveillance", I.E.I.I.T.—National Research Center Turin-Italy, pp. 1-29, Stanford, Dec. 9, 2005.

(Continued)

*Primary Examiner* — W B Perkey (57) ABSTRACT

An electronic system for enhancing camera focusing on a portable electronic device is disclosed. The system comprises a body, a bus, and a camera module coupled to the bus and comprising a photosensitive substrate and a lens assembly wherein the lens assembly comprises a lens capable of being selectively moved to a distance from the photosensitive substrate for light focus thereon. Further, it comprises an accelerometer coupled to the bus and configured to generate orientation information, said orientation information indicating contemporaneous orientation of the body with respect to a predetermined reference. It also comprises a memory and a processor coupled to the bus. The memory comprises instructions that when executed implement an autofocus program configured to automatically determine the distance based on: 1) image data captured by said camera module; and 2) the orientation information generated by the accelerometer.

23 Claims, 9 Drawing Sheets

(56) References Cited

U.S. PATENT DOCUMENTS

| | | |
|---|---|---|
| 7,623,774 B2 * | 11/2009 | Rukes ............................. 396/50 |
| 7,760,442 B2 | 7/2010 | Ishida et al. |
| 8,049,811 B2 | 11/2011 | Gamadia et al. |
| 8,340,512 B2 | 12/2012 | Garg, I et al. |
| 8,351,776 B2 | 1/2013 | Garg et al. |
| 8,368,255 B2 | 2/2013 | Park et al. |
| 8,581,957 B2 * | 11/2013 | Bengtsson et al. ......... 348/14.08 |
| 8,582,017 B2 | 11/2013 | Seol et al. |
| 2003/0123751 A1 | 7/2003 | Krishnamurthy et al. |
| 2003/0128756 A1 | 7/2003 | Oktem |
| 2005/0024487 A1 | 2/2005 | Chen |
| 2005/0207743 A1 * | 9/2005 | Uehara ............................. 396/50 |
| 2005/0275747 A1 | 12/2005 | Nayar et al. |
| 2006/0215924 A1 | 9/2006 | Steinberg et al. |
| 2006/0274643 A1 | 12/2006 | Choyi et al. |
| 2006/0291845 A1 | 12/2006 | Sugimoto |
| 2007/0104472 A1 | 5/2007 | Quan et al. |
| 2007/0206941 A1 | 9/2007 | Maruyama et al. |
| 2008/0043686 A1 | 2/2008 | Sperti et al. |
| 2008/0152245 A1 | 6/2008 | El-Maleh et al. |
| 2008/0225944 A1 | 9/2008 | Pore et al. |
| 2009/0284850 A1 | 11/2009 | Huang et al. |
| 2013/0070148 A1 | 3/2013 | Kim |
| 2013/0148011 A1 | 6/2013 | Chou |
| 2013/0169832 A1 | 7/2013 | Park et al. |
| 2014/0192251 A1 | 7/2014 | Speltz |

FOREIGN PATENT DOCUMENTS

| | | |
|---|---|---|
| WO | 2013098595 | 7/2013 |
| WO | 2014100516 | 6/2014 |

OTHER PUBLICATIONS

Lin Tong and K.R. Rao, "Region of Interest Based H.263 Compatible Codec and Itsrate Control for Low Bit Rate Video Conferecing", Proceedings of 2005 International Symposium on Intelligent Signal Processing and Communication Systems, pp. 249-252, Dec. 13-16, 2005.

Pierpaolo Baccichet, Xiaoqing Zhu, and Bernd Girod, "Network-Aware H264/AVC Region-of-interest Coding for a Multi-Camera Wireless Surveilance Network", pp. 1-6, Downloaded Mar., 2007.

Yu Sun, Member, IEEE, Ishfaq Ahmad, Senior Member, IEEE, Songdong Li, Student Member, IEEE, and Ya-Qin Zhang, Fellow, IEEE, "Region-Based Rate Control and Bit Allocation for Wireless Video Transmission", IEEE Transactions on Multimedia, vol. 8, No. 1, pp. 1-10, Feb., 2006.

Jeng-Wei Chen, Mei-Juan Chen and Ming-Chieh Chi, "Region-of-Interest Video Coding Based on Face Detection", Springer-Verlag Berlin Heidelberg, pp. 1201-1211, Year 2002.

Yu Sun, Dongsong Li, Ishfaq Ahmad and Jiancong Luo, "A Rate Control Algorithm for Wireless Video Transmission Using Perceptual Tuning", Proceedings of the International Conference on Information Technology: Coding and Computing (ITCC'05), 0-7695-2315-3/05 IEEE, pp. 1-6.

* cited by examiner

METHODS FOR ENHANCING CAMERA FOCUSING PERFORMANCE USING CAMERA ORIENTATION

FIELD OF THE INVENTION

Embodiments according to the present invention generally relate to portable electronic devices and more specifically to methods for enhancing focusing on cameras for portable electronic devices.

BACKGROUND OF THE INVENTION

Facilitating automatic capture of high quality images with little or no user intervention is the primary objective in a camera system design for a consumer level portable electronic device, e.g., cell-phone, tablet, etc. Typically, consumers consider image sharpness to be a critical factor of final image quality. The sharpness of the final captured image is determined in significant part by the ability of the camera's auto-focus (AF) system to adjust the distance between the lens and image sensor in such a way as to render an object of interest at a certain distance from the camera onto the image sensor with an imperceptible amount of blur.

Due to its ease of hardware integration, the passive AF approach has become the de facto standard in realizing the AF feature for compact consumer portable electronic camera systems. In passive AF, a measure of image sharpness is extracted from a portion of the captured image. This measure is then used to adjust the imaging distance via a search procedure on the camera's processor so that the extracted measure obtains a peak value.

Accordingly, focus region, sharpness measure and sharpness search procedure are the three major components to a passive AF method. The goal for the sharpness measure procedure is to determine the in-focus position quickly without overshooting or oscillating around the peak as consumers desire a smooth AF experience with minimum overshoot and no rapid oscillation between extreme levels of focus and defocus. The efficiency of the search depends on the number of times the distance between the lens and the image sensor is adjusted to bring the image into focus.

In general, the camera module of a portable electronic device with photographic capabilities is configured with a Voice-Coil Motor (VCM) which is the solution with the lowest cost as well as the minimum volume for the auto-focusing function. Furthermore, the mechanical structure of the VCM is durable and vibration resistible. The main components of a VCM are a magnet and a coil, and a relative motion between the image sensor and the lens is generated by the repellence of the magnetic fields produced by the electric current going through the coil. This repellence of the magnetic fields between the magnet and the coil determines the distance between the lens and the image sensor.

Conventional portable electronic device camera modules employing the VCM solution typically run into AF problems because the components of the VCM assembly are sensitive and, as a result, gravitational force applied to the moving component may restrict or alter its movement and can influence the range of allowable movement of the lens with respect to the image sensor depending on the orientation of the device. In other words, the presence of gravity acting on the moveable component in the lens assembly acts to reduce the range of motion of a moveable component. Consequently, depending on the orientation of the device, the AF procedure can either take a longer time to find the peak value or, in the worst case, may not be able to find the peak value at all.

BRIEF SUMMARY OF THE INVENTION

Accordingly, a need exists for systems and methods for enhancing the camera's AF performance by taking into account the orientation of a device employing a voice coil motor (VCM) focuser. The device orientation with respect to the gravitational field direction will influence the true range for the moveable component of the camera's lens assembly. In one embodiment, the present invention enhances automatic camera focusing on a portable electronic device by factoring in the orientation of the camera's optical axis relative to gravity during auto-focus. In another embodiment, the present invention temporarily suspends the AF procedure based on the speed of the device orientation change, so to conserve power during periods when the device and the image thereon are in a state of flux.

In one embodiment, the present invention is an electronic system for enhancing camera focusing on a portable electronic device. The system comprises a body, a bus, and a camera module coupled to the bus and comprising a photosensitive substrate and a lens assembly wherein the lens assembly comprises a lens capable of being selectively moved to a distance from the photosensitive substrate for light focus thereon. Further, it comprises an accelerometer coupled to the bus and configured to generate orientation information, said orientation information indicating contemporaneous orientation of the body with respect to a predetermined reference. It also comprises a memory and a processor coupled to the bus. The memory comprises instructions that when executed implement an autofocus program configured to automatically determine the distance based on: 1) image data captured by said camera module; and 2) the orientation information generated by the accelerometer.

In another embodiment, the present invention is a computer-readable storage medium having stored thereon, computer executable instructions that, if executed by a computer system cause the computer system to perform a method for camera focusing on a portable electronic device. The method comprises deriving an orientation of a camera module on the portable electronic device. It further comprises determining an offset to a reference displacement range of a focuser within the camera module using information regarding the orientation, wherein the reference displacement range is associated with a range of motion between a lens assembly and an image sensor at a reference camera orientation. Additionally, it comprises searching for a focus position for the focuser automatically using the offset and the reference displacement range.

Finally, in one embodiment, the present invention is a method for camera focusing on a portable electronic device. The method comprises deriving an orientation of a camera module on the portable electronic device. It further comprises determining an offset to a reference displacement range of a focuser within the camera module using information regarding the orientation, wherein the reference displacement range is associated with a range of motion between a lens assembly and an image sensor at a reference camera orientation. Additionally, it comprises searching for a focus position for the focuser automatically using the offset and the reference displacement range.

The following detailed description together with the accompanying drawings will provide a better understanding of the nature and advantages of the present invention.

BRIEF DESCRIPTION OF THE DRAWINGS

Embodiments of the present invention are illustrated by way of example, and not by way of limitation, in the figures of the accompanying drawings and in which like reference numerals refer to similar elements.

In the figures, elements having the same designation have the same or similar function.

DETAILED DESCRIPTION OF THE INVENTION

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Notation and Nomenclature

Some portions of the detailed descriptions that follow are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those utilizing physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "calibrating," "characterizing," "deriving," "determining," and "searching" or the like, refer to actions and processes (e.g., flowchart 800 of FIG. 8) of a computer system or similar electronic computing device or processor (e.g., system 100 of FIG. 1). The computer system or similar electronic computing device manipulates and transforms data represented as physical (electronic) quantities within the computer system memories, registers or other such information storage, transmission or display devices.

For expository purposes, the term "horizontal" as used herein refers to a plane parallel to the plane or surface of an object, regardless of its orientation. The term "vertical" refers to a direction perpendicular to the horizontal as just defined. Terms such as "above," "below," "bottom," "top," "side," "higher," "lower," "upper," "over," and "under" are referred to with respect to the horizontal plane.

Embodiments described herein may be discussed in the general context of computer-executable instructions residing on some form of computer-readable storage medium, such as program modules, executed by one or more computers or other devices. By way of example, and not limitation, computer-readable storage media may comprise non-transitory computer-readable storage media and communication media; non-transitory computer-readable media include all computer-readable media except for a transitory, propagating signal. Generally, program modules include routines, programs, objects, components, data structures, etc., that perform particular tasks or implement particular abstract data types. The functionality of the program modules may be combined or distributed as desired in various embodiments.

Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can accessed to retrieve that information.

Communication media can embody computer-executable instructions, data structures, and program modules, and includes any information delivery media. By way of example, and not limitation, communication media includes wired media such as a wired network or direct-wired connection, and wireless media such as acoustic, radio frequency (RF), infrared, and other wireless media. Combinations of any of the above can also be included within the scope of computer-readable media.

Methods for Enhancing User Interaction with Mobile Devices

Conventional portable electronic device camera modules employing cameras using voice coil motors (VCMs) run into problems with the auto-focus (AF) function of the VCM based focuser in the camera because the components of the VCM assembly are sensitive and, as a result, gravitational force can influence the allowable range of movement of the lens with respect to the image sensor within the VCM assembly depending on the orientation of the device. In other words gravity can have an effect on the active region of operation for the moveable lens component of the camera. Consequently, depending on the orientation of the device, the AF procedure can either take a longer time to find a peak value for focus evaluation using the hill-climbing method or, in the worst case, may not be able to find the peak value at all.

Accordingly, a need exists for systems and methods for enhancing the camera's AF performance by taking into account the orientation of a device employing a voice coil motor (VCM) focuser. In one embodiment, the present invention improves auto-focusing by providing a better model of the range and trajectory of the VCM focuser's motion by factoring in the orientation of the camera's optical axis relative to gravity during auto-focus. Further, in one embodiment, the present invention uses the orientation of the camera to determine and control the movement of the moveable lens component in the camera. In one embodiment, the present invention computes an offset value based on camera orientation that allows the auto-focusing procedure in the camera to direct the focus operation into an active region of movement for the moveable lens component.

In another embodiment, the present invention temporarily suspends the AF procedure based on the speed of the device orientation change, so to conserve power during periods when the device and the image thereon is in a state of flux.

Most contemporary devices now incorporate components such as accelerometers and gyroscopes (or gyro sensors) that, among other things, can be used to determine the orientation of the device. Accelerometers are sensors that can measure the magnitude and direction of the acceleration of the device, and can be used to sense the orientation of the device. Meanwhile, a gyroscope can be used to either measure, or maintain, the orientation of a device. Unlike an accelerometer, which measures the linear acceleration of the device, a gyroscope measures the orientation directly. When a device's accelerometer measurements are combined with the gyroscope measurements, motion can be sensed on six-axes: up and down, left and right, forward and backwards, as well as the roll, pitch and yaw rotations. By comparison, certain devices use tri-axis accelerometers to determine the posture of the device. Tri-axis accelerometers can sense acceleration on all three axes, namely, X, Y and Z. The screen orientation is often determined by the X and Y axis acceleration and the tilt angle of the device by the Z axis acceleration.

Figure 1:
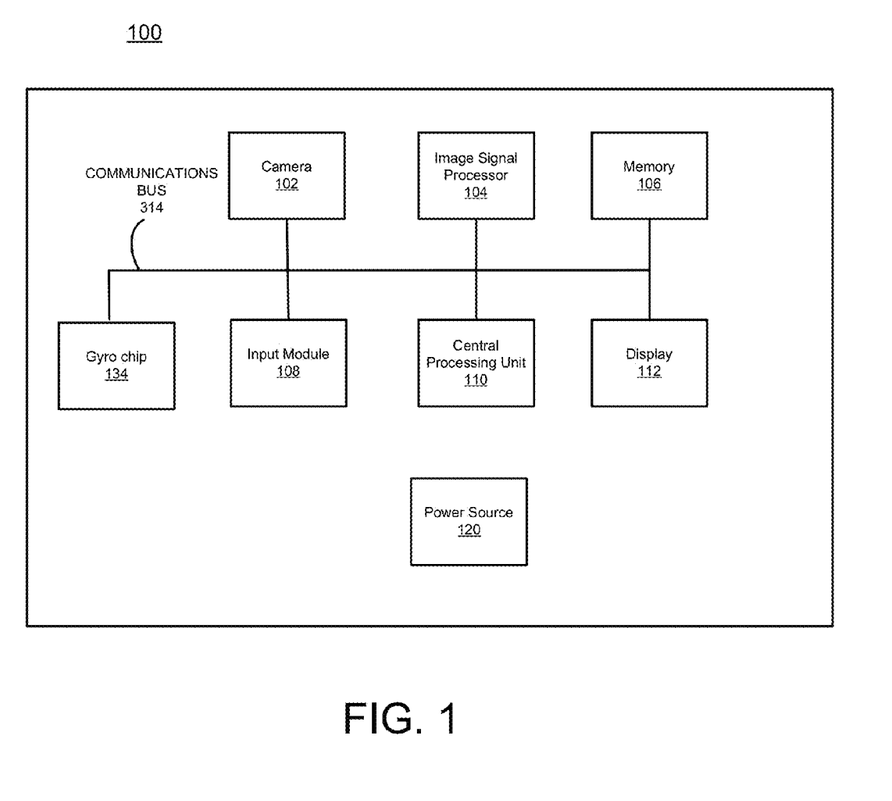
FIG. 1 shows an exemplary operating environment in accordance with one embodiment of the present invention.

FIG. 1 shows an exemplary operating environment or "device" in accordance with one embodiment of the present invention. System 100 includes camera 102, image signal processor (ISP) 104, memory 106, input module 108, central processing unit (CPU) 110, display 112, communications bus 114, gyro chip 134, and power source 120.

Power source 120 provides power to system 100 and may be a DC or AC power source. System 100 depicts the components of an exemplary system in accordance with embodiments of the present invention providing the execution platform for certain hardware-based and software-based functionality. Although specific components are disclosed in system 100, it should be appreciated that such components are examples. That is, embodiments of the present invention are well suited to having various other components or variations of the components recited in system 100. It is appreciated that the components in system 100 may operate with other components other than those presented, and that not all of the components of system 100 may be required to achieve the goals of system 100.

CPU 110 and the ISP 104 can also be integrated into a single integrated circuit die and CPU 110 and ISP 104 may share various resources, such as instruction logic, buffers, functional units and so on, or separate resources may be provided for image processing and general-purpose operations. System 100 can be implemented as, for example, a digital camera, cell phone camera, portable device (e.g., audio device, entertainment device, handheld device), webcam, video device (e.g., camcorder) or any other device with a front or back facing camera.

In one embodiment, camera 102 captures light via a front-facing or back-facing lens (depending on how the user typically holds the device), and converts the light received into a signal (e.g., digital or analog). In another embodiment, system 100 may also have another camera facing away from the user (not shown). Camera 102 may comprise any of a variety of optical sensors including, but not limited to, complementary metal-oxide-semiconductor (CMOS) or charge-coupled device (CCD) sensors. Camera 102 is coupled to communications bus 114 and may provide image data received over communications bus 114. Camera 102 may comprise functionality to determine and configure optical properties and settings including, but not limited to, focus, exposure, color or white balance, and areas of interest (e.g., via a focus motor, aperture control, etc.).

Camera 102 may also include a VCM focuser module. The VCM is a motor that uses a vibration plate of a speaker by utilizing the magnetic field generated by a current flowing in a voice coil of a speaker and a magnetic field generated by a permanent magnet. The VCM is advantageous in that it consumes less electric power, is less voluminous and inexpensive and has a high accuracy in operation displacement, such that the VCM is adequate in adjusting a gap between a lens and an image sensor in a camera module.

Image signal processor (ISP) 104 is coupled to communications bus 114 and processes the signal generated by camera 104, as described herein. More specifically, image signal processor 104 may process data from camera 102 for storing in memory 106. For example, image signal processor 104 may compress and determine a file format for an image to be stored in within memory 106.

Input module 108 allows entry of commands into system 100 which may then, among other things, control the sampling of data by camera 102 and subsequent processing by ISP 104. Input module 108 may include, but it not limited to, navigation pads, keyboards (e.g., QWERTY), up/down buttons, touch screen controls (e.g., via display 112) and the like.

Central processing unit (CPU) 110 receives commands via input module 108 and may control a variety of operations including, but not limited to, sampling and configuration of camera 102, processing by ISP 104, and management (e.g., addition, transfer, and removal) of images and/or video from memory 106.

Gyro chip 134 is a means (rotation detection means) for detecting the displacement of the device housing from a pre-determined posture position by rotation. The gyro chip 134 can comprise a ceramic gyro, an accelerometer or acceleration sensor, or the like. The gyro chip 134 detects an acceleration applied to the housing, and supplies the result to central processing unit 110. For example, when the housing of the device is rotated clockwise through about 90 an output from the gyro chip 134 also changes along with the rotation. The magnitude of a change in an output from the gyro chip 134 corresponds to the rotation amount of the housing.

Figure 2:
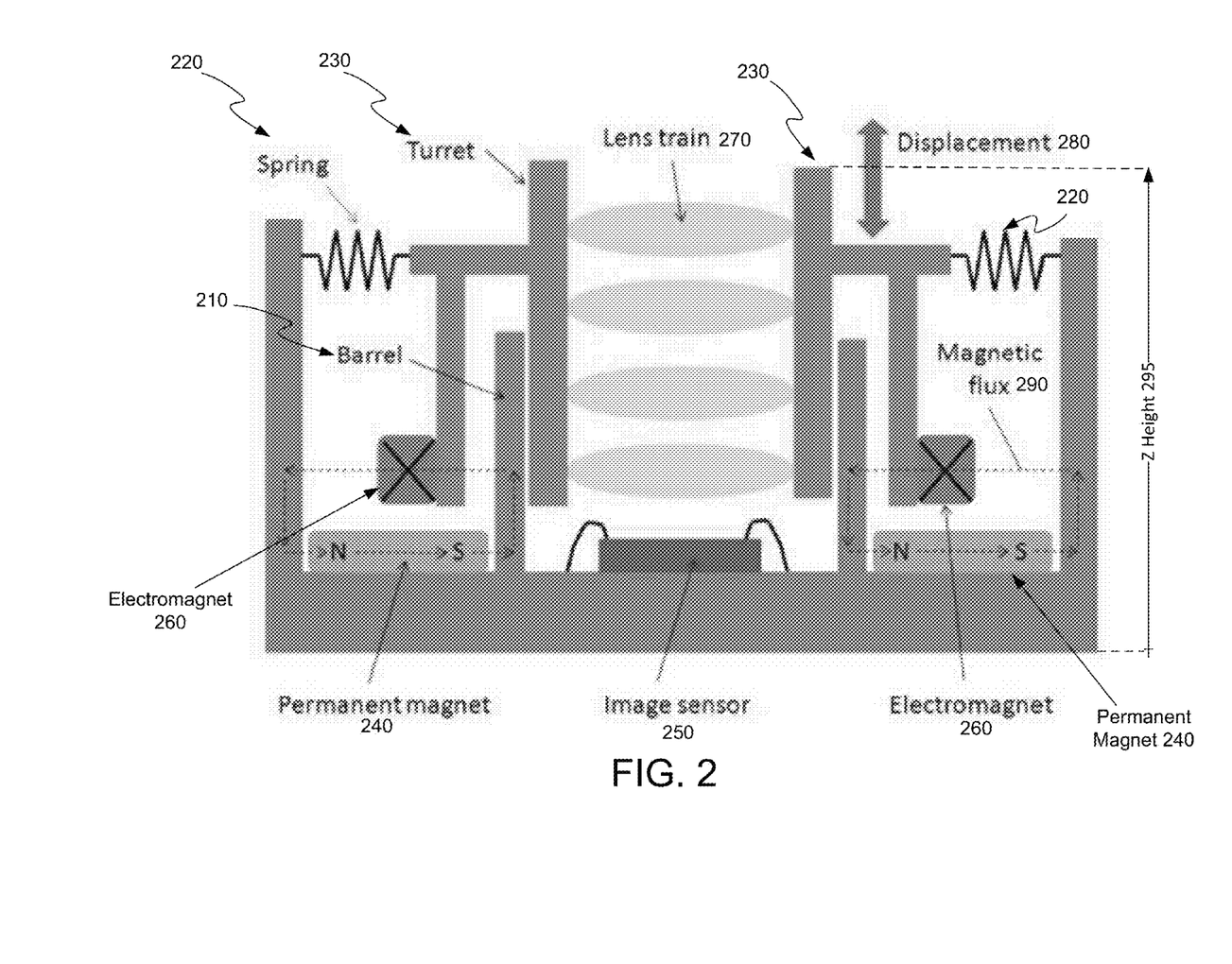
FIG. 2 is a conceptual cross-sectional view illustrating a configuration of a VCM based focuser module according to an exemplary embodiment of the present invention.

FIG. 2 is a conceptual cross-sectional view illustrating a configuration of a VCM based focuser module according to an exemplary embodiment of the present invention. The exemplary embodiment includes springs 220, turrets 230, a plurality of lenses (a lens train) 270, a barrel 210, electromagnets 260, permanent magnets 240 and an image sensor 250.

As illustrated in FIG. 2, the position of lens train 270 can be moved with respect to the sensor 250 by varying a magnetic field. The allowable range of the movement between the sensor 250 and lens train 270 in conventional cameras can vary depending on factors including gravitational effect and the strength of the magnetic flux between the electromagnets 260 and permanent magnets 240. The image sensor 250 faces the lens train 270 and is optically aligned with the lens train 270, and the image sensor 250 and lens train 270 are coaxial with each other. The image sensor 250 is secured to barrel 210 using bonding wires.

The turret 230 performs the function of supporting the lens train 270 as they move towards or away from the image sensor 250 along the coaxial axis. The turret may also comprise a magnetic coil that can take various shapes. For example, the coil may be wound along a circumference of the turret 230. It can also comprise an electromagnet module 260 attached along a periphery of turret 230 as shown in FIG. 2.

The barrel 210 is the static base and also offers the track for the lens assembly to move up and down. Permanent magnets 240 are attached to barrel 210. The permanent magnets 240 are discretely positioned from the electromagnet module 260. Springs 220 connect the turrets 230 to the barrel 210 and provide an elasticity to allow the turrets to linearly and vertically move.

A magnetic flux 290 is formed from the permanent magnet 240 towards the electromagnet 260. For example, in case a current flows in the electromagnet 260 (or coil) toward a ground, a force is formed upwards of the electromagnet. Therefore, the electromagnet 260, the turret 230 integrated with the electromagnet 260, along with the attached lens train 270, vertically move and result in a displacement 280 from their default position. The VCM based focuser module also comprises a VCM actuator driver (not shown) for driving the VCM actuator. The electromagnet 260 can be connected to the VCM actuator driver and the VCM actuator driver can control the current flowing in the electromagnet. The current supplied by the VCM actuator driver is in turn determined by the AF procedure being employed by the camera module.

The lens train 270 is closest to the image sensor 250 when there is no current being provided to the electromagnet 260 by the VCM actuator driver. Typically, this is also the default position for parking the lens train 270 resulting because it consumes the least amount of energy and battery life preservation is one of the most important factors considered in camera design. The default position for lens train 270 corresponds to a focus value of infinity, wherein any objects further than a certain range (e.g., 5 meters depending on the camera and the lens) will appear to be in focus. The more the current supplied to electromagnet 260, on the other hand, the further away lens train 270 will move from the image sensor 250, allowing the camera module to focus on objects that are very near. The AF procedure controls the VCM actuator driver to supply current to the electromagnet 260 when the object of focus is perceived to be close in distance to the camera, or instructs it to reduce current when the object of focus is perceived to be further away from the camera.

Z-height 295 is the height of the VCM based focuser module. As handheld electronics continue to get more miniaturized and form factors continue to reduce, there is increasing pressure on camera manufacturers to reduce the z-height of VCM based focuser modules. However, the narrower the z-height 295 parameter gets, the smaller the components such as the permanent magnet are required to be and, as a result, the more sensitive the components of the focuser assembly are to external forces such as gravity. Further, the size of the components like the permanent magnet cannot be increased because they are typically designed using rare materials and increasing their size would add to the cost of the device, which is unacceptable to both users and manufacturers.

Accordingly, for contemporary cameras with shorter z-heights, gravitational force can disrupt the AF procedure by distorting displacement 280 and causing the turret 230 and the lens train 270 to move to a location where it is not calibrated to be under the influence of gravity. In other words, gravity may alter the allowable range of motion of lens train 270. For example, assuming that in both cases the camera is focusing on an equidistant object, the position of the lens train will be different when the face of the camera is facing upwards versus when its facing downward. When facing downwards, the lens train will be pulled away from the image sensor, whereas when facing upwards, the lens train will be pulled towards the image sensor. As a result of the unpredictability of the lens position, it is challenging for the AF procedure to find the peak focus point. Part of the challenge is that for a given magnetic field strength, the lens may be in different positions depending on the camera orientation relative to the direction of the gravitational field.

Figure 3:
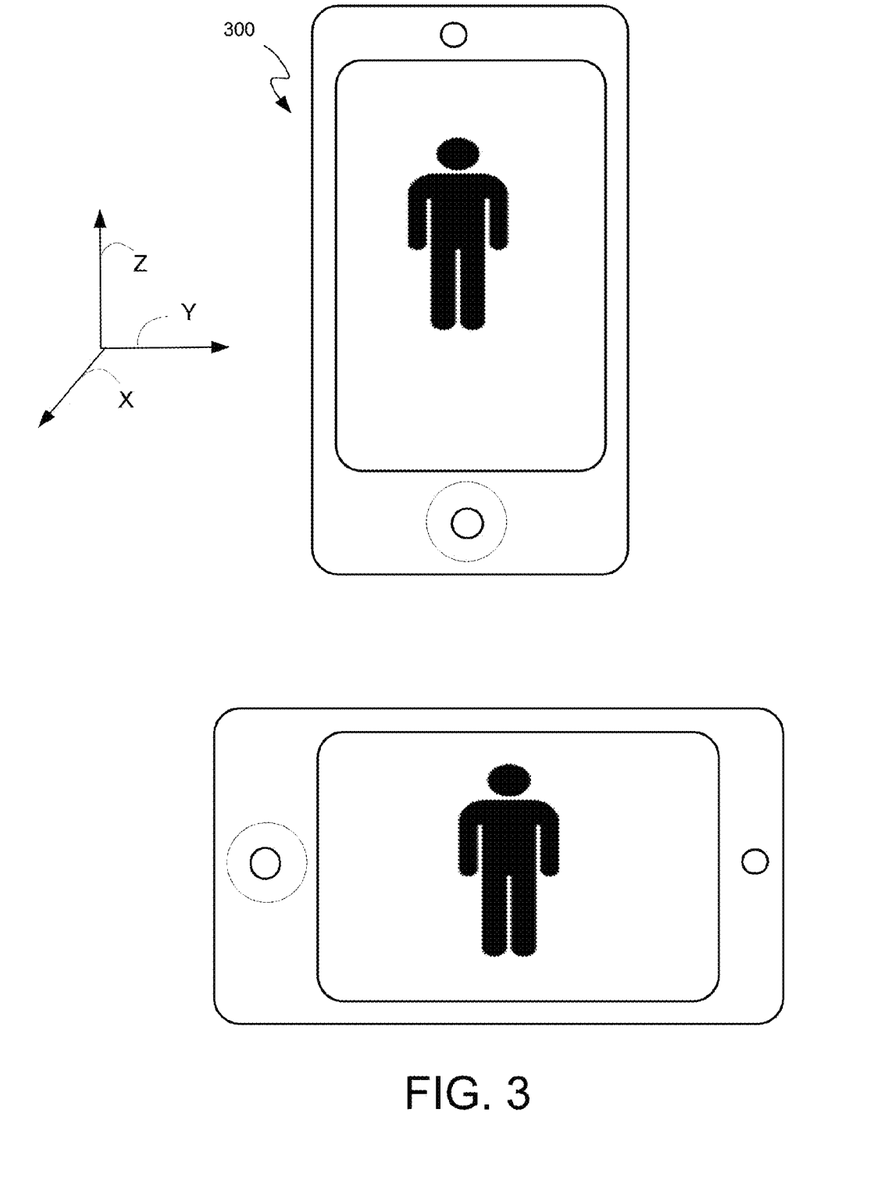
FIG. 3 is a perspective view showing the screen display of a portable electronic device in two different orientations wherein the angle between the camera's optical axis and gravity vector remain the same.

The effect of the gravitational force on the position of the lens train will, however, be consistent for camera orientations where the angle between the camera's optical axis and gravity vector stay the same. Accordingly, the active region of operation for the moveable lens component 270 will not be altered as between these orientations. FIG. 3 is a perspective view showing the screen display of a portable electronic device in two different orientations wherein the angle between the camera's optical axis and gravity vector remain the same. Camera modules are typically installed on the front or the back of the portable electronic device. The optical axis is consequently orthogonal to the front or the back plane. As illustrated in FIG. 3, the angle between the optical axis of the camera and gravity vector remains in the same in both orientations. Accordingly, the effect of gravitational force on the lens train position will be the same for both orientations.

Figure 4A:
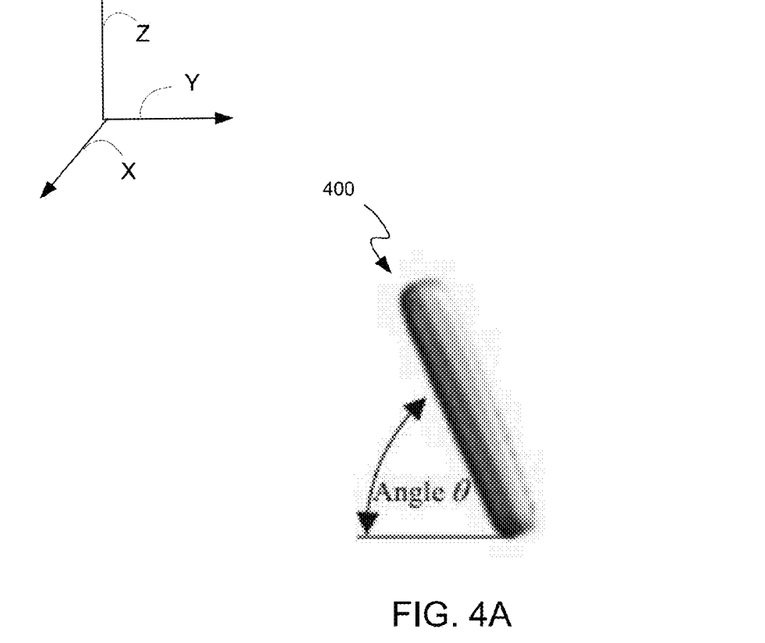
FIG. 4A is a perspective view showing a mobile device with a tilt angle theta, wherein the angle between the camera optical axis and gravity vector is determined by the tilt angle theta.
Figure 4B:
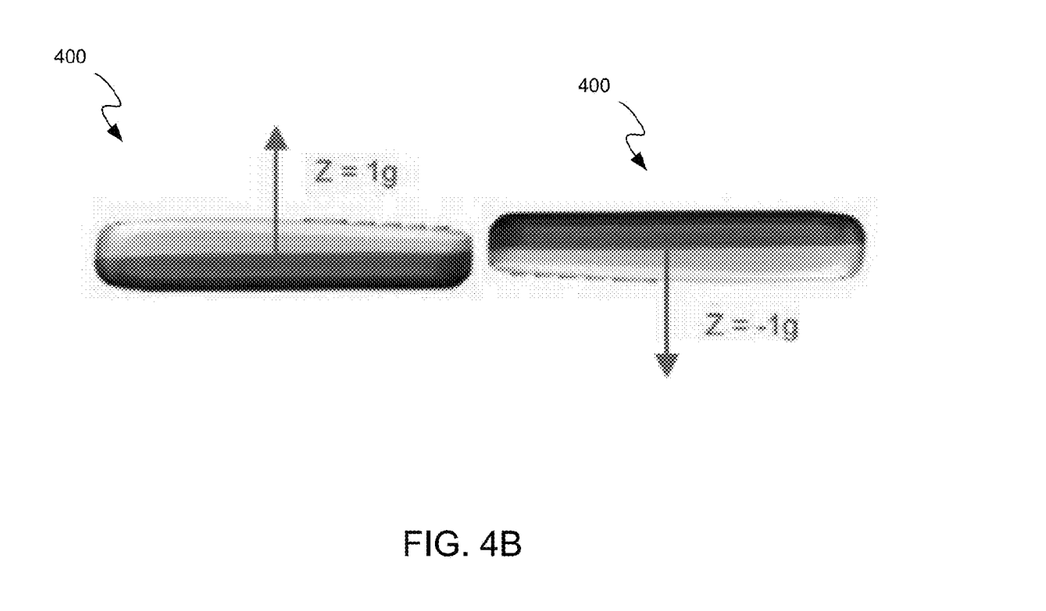
FIG. 4B is a perspective view showing a mobile device in a face up and a face down posture.

By comparison, the position of the lens train will be affected as between orientations where the angle between the optical axis and gravity vector do change. FIG. 4A is a perspective view showing a mobile device with a tilt angle theta, wherein the angle between the camera optical axis and gravity vector is determined by the tilt angle theta. Further, FIG. 4B is a perspective view showing a mobile device in a face up and a face down posture. In FIG. 4A, the angle between the camera's optical axis and gravity vector is determined by the tilt angle theta. In FIG. 4B, the two orientations are 180° out of alignment with each other. Accordingly, the effect of gravitational force on the lens train position will be different for all the orientations illustrated in FIGS. 4A and 4B.

Figure 5:
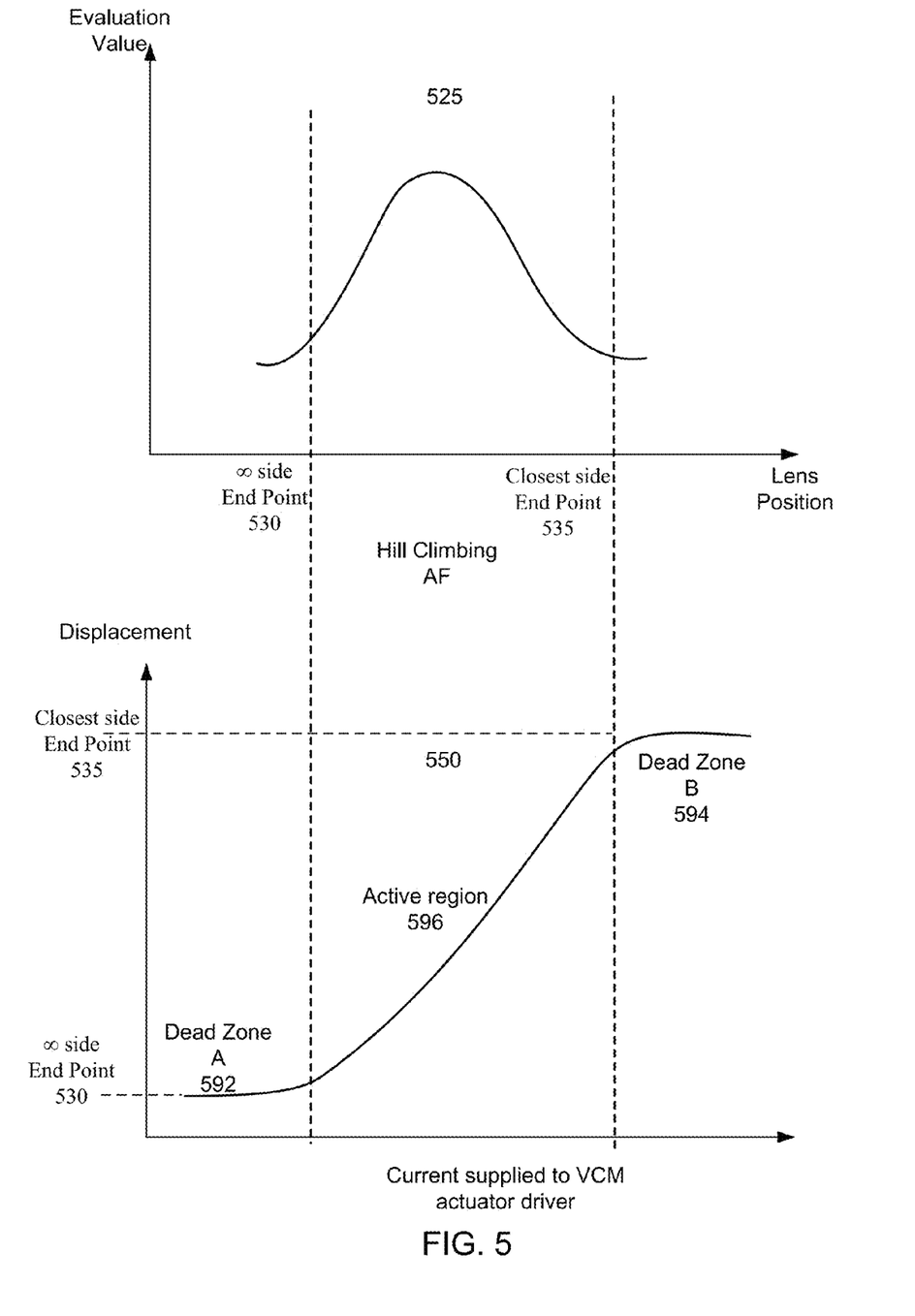
FIG. 5 illustrates graphically how the displacement of the lens train of the VCM assembly relates to the hill-climbing method for auto-focusing.

FIG. 5 illustrates graphically how the displacement of the lens train of the VCM assembly relates to the hill-climbing method for auto-focusing. The AF procedure controls the VCM actuator driver to supply or reduce current to the electromagnet 260 while trying to converge to the optimal focal point. As will be discussed below, the AF procedure will look for a point of optimal focus within the active region 596 of the displacement curve 550 by trying to perform a hill-climbing procedure as illustrated by curve 525.

In one embodiment, the AF procedure uses a hill-climbing method to find the optimal point of focus. As graph 525 illustrates, a ∞ side end point 530 within the movable range of the lens train 270 bounds one end of the lens position of the lens train 270 which has a focal point at ∞. Also a closest side end point 535 on the other end of the movable range of lens train 270 bounds the other end of the lens position of lens train 270 having a focal point at the closest point.

As discussed above, the default position the lens train starts at is at the ∞ side end point. As the AF procedure tries to automatically focus, the lens train 270 is moved by a predetermined distance towards the closest side end point 535 and farther from the present lens position. An AF evaluation value is obtained by the AF procedure at the new position that the lens train is moved to. This AF evaluation value can be obtained, for example, by analyzing the image and quantifying the image sharpness. The obtained AF evaluation value is compared with the prior AF evaluation value and if it is determined that the new AF evaluation value is higher than the previous one, the lens train 270 is moved further towards the closest side end point 535 by signaling the VCM actuator driver to supply more current to the electromagnet 260. This process is repeated with the lens train 270 moving a predetermined distance at every interval as the evaluation value increases.

While the lens train 270 is moved in the determined direction, a peak detection is performed. The movement is repeated till a smaller AF evaluation value than the immediately preceding one is obtained on the side toward which the lens is moved. The peak evaluation is detected when the curve begins to slope downward. Once the AF evaluation values start getting smaller, the AF procedure will start moving the lens train 270 backward till a peak is detected. This procedure of finding the optimal focus is known as the hill-climbing method.

If the lens train 270 is close to one of the end points but not at the end point, the AF procedure, in one embodiment, can be programmed to move the lens train towards the end point it is closest to first before it starts working its way backward to find the peak evaluation point.

As illustrated in graph 550, of FIG. 5, the displacement of the lens train 270 is proportional to the current being supplied to the VCM actuator driver between the two end points. However, the displacement curve cuts off at the ∞ side end point 530 on the lower end when the lens train 270 is closest to image sensor 250 within its range of motion. The displacement curve also cuts off at the upper end at the closest side end point 535 when the lens train 270 is furthest from image sensor 250 within its range of motion. Accordingly, regardless of the increase in current, once the lens train 270 moves into dead zone B 594, the lens train position will not change. Similarly, regardless of the decrease in current, once the lens train 270 moves into dead zone A 592, the lens train position will not change. However, in the active region 596, as stated above, the position of the lens train 270 will change proportionately with the current supplied to the VCM actuator driver.

As described below, the orientation of the camera will alter the zone ranges, 592, 594 and 596, because of gravity acting on the moveable lens 270 and restricting its movement.

Figure 6:
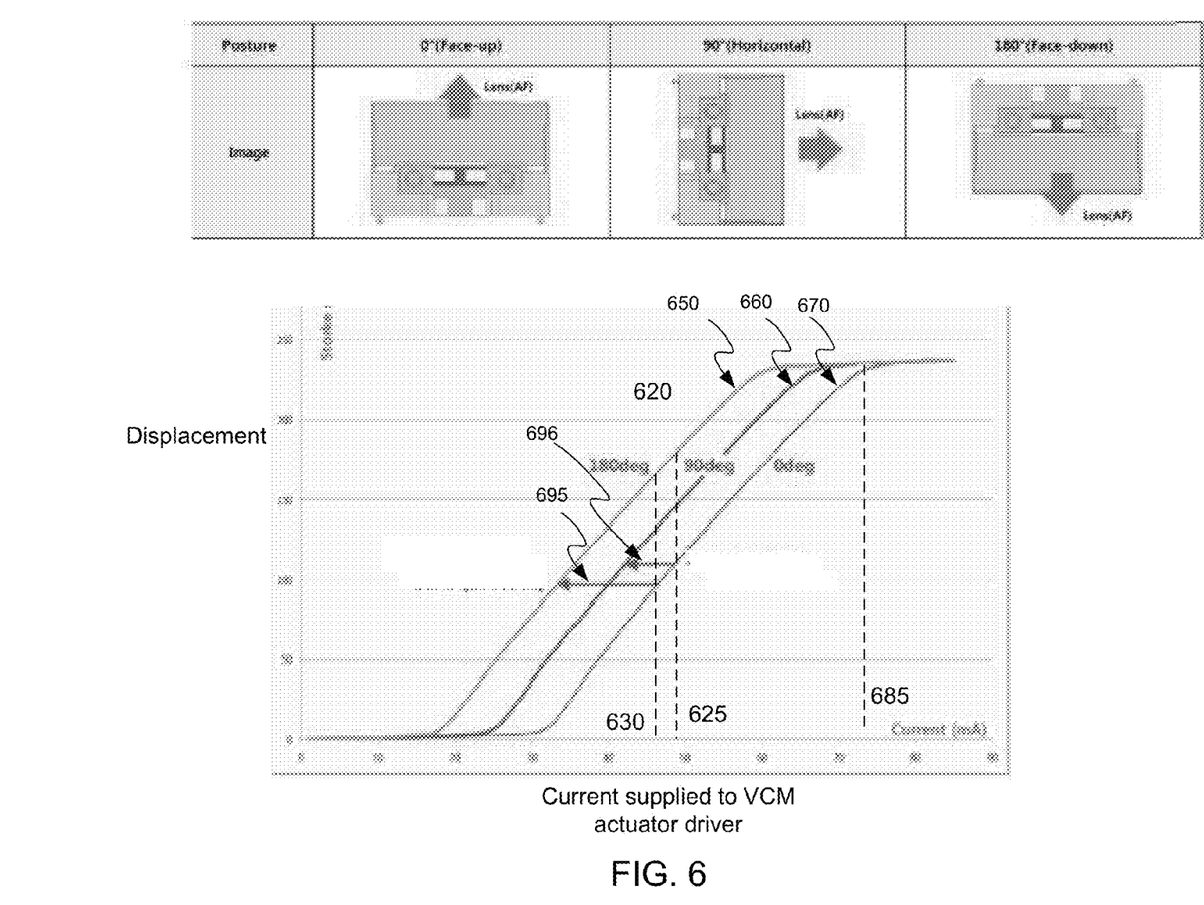
FIG. 6 illustrates a graphical view of the lens position of a camera in a portable electronic device under the same current control but different postures.

FIG. 6 illustrates a graphical view of the lens position of a camera in a portable electronic device under the same current control but different postures. As graph 620 illustrates, the "lens train displacement" versus the "current supplied to VCM actuator driver" curves (referred to hereinafter as "displacement curves") shift in accordance with the orientation of the portable electronic device camera. Stated differently, the orientation of the camera alters the relative position of the active region and dead zones for the camera module.

Displacement curve 650 represents the behavior of the lens train position when the camera is face down. Curve 660 represents the behavior of the lens train position when the camera is horizontal. Curve 670 represents the behavior of the lens train position when the camera is face up. As apparent from the three displacement curves, when the camera is face down and gravity is directly acting on the VCM assembly, the displacement values are relatively higher for every value of current in the active region.

For example, at both current values 630 and 625, curve 650 exhibits the highest level of displacement. However, curve 650 also reaches its dead zone at the upper limit at a lower current value than the other two curves. Similarly, curve 650 also climbs out of its dead zone at the lower limit and gets into its active region at a lower current value than the other two curves. Thus, the displacement is highest when the camera is facing down and second highest when it is held horizontally at an angle of 90 degrees with respect to gravity. Meanwhile, displacement is the least when the camera is facing up and gravity is pulling the lens train towards the image sensor. Therefore, the dead zone ranges change depending on the orientation of the camera.

This inconsistency in the displacement as a result of differing camera orientations is problematic for at least two reasons. First, because the varying orientations may result in different ranges of displacement of lens for the same current value applied, the AF procedure does not produce repeatable results. The result of the AF procedure, therefore, may vary with camera orientation. It would be cost prohibitive to characterize the gravitational effects on the lens train position for the cameras individually and calibrate them separately. Accordingly, an AF procedure is needed that all camera modules can be programmed with that can take into account camera orientation and automatically adjust for gravitational effects on the lens train position.

The second reason the inconsistencies in displacement is problematic is that if the displacement curve shifts based on camera orientation as shown in graph 620, then the AF procedure cannot be programmed with consistent current values that it can feed to the VCM actuator driver to move the lens train out of the dead zone regions and into the active regions of the displacement curve. The inconsistencies result in the AF procedure getting stuck in the dead zone regions of the displacement curve and, consequently, not being able to perform the hill-climbing procedure correctly to find the optimal point of focus. For example, if the camera is calibrated to operate in accordance with curve 670, the AF procedure expects the VCM focuser to operate out of the dead zone region at values below current value 685 as illustrated in FIG. 6. However, if the camera is being held face down and the VCM focuser is now acting in accordance with curve 650, the AF procedure will likely get stuck in the dead zone region and not be able to adequately perform the hill-climbing procedure, because it relies on finding a gradient between successively obtained values.

In order, for the AF procedure to be agnostic to camera orientation, it would need to operate on a displacement curve that has been normalized to, for example, the 0° displacement curve 670. In this case, displacement curve 650 would have to be offset by a displacement towards the right on the x-axis corresponding to value 695, while displacement curve 660 would have to be offset by a displacement towards the right on the x-axis corresponding to value 696.

The embodiments of the present invention advantageously use the orientation of the camera module as obtained from the gyro chip 134 to determine and control the movement of the lens train 270 more precisely. Specifically, embodiments of the present invention improve auto-focusing by knowing the orientation of the camera optical axis relative to the gravity vector and computing the active region of lens movement based on the orientation.

In one embodiment of the present invention, the VCM focuser's motion range and trajectory is calibrated under multiple postures and orientations and the results are saved in memory during camera focus operations.

In one embodiment, the offset to the focuser end positions, namely the ∞ side end point and the closest side end point positions, can be formulated as the following function:

$$\text{Offset} = \text{constant} + h^* \cos(\Theta + \Phi)$$

In the above formula, $\Theta$ represents the camera angle with respect to gravity while $\Phi$ represents the phase offset. The values of the "constant", "h" and "$\Phi$" can be determined by calibrating the camera using at least three different orientations or postures. In one embodiment, the formula is determined by calibrating the camera in the three positions illustrated in FIG. 6: face up, horizontal and face down. Once the formula is determined, interpolation can be used to determine the offset for any other posture. As stated above, this offset can then help determine the active region of operation for the lens train 270 of the camera module.

Alternatively, in a different embodiment, instead of using a formula, the offset at each possible angle can be determined empirically. The AF procedure can then store the look up table of offsets in memory and use the look up table to determine the offset for a given orientation. In this way, the active region of lens movement is known for all possible camera orientations.

In one embodiment, the offset formula can be determined using an average response from a group of camera modules obtained from the same manufacturing process. This allows the calibration to be more precise for the camera modules in that batch. If the camera modules in a batch are known to be consistent between each other, then, in one embodiment, values from the camera module specification can typically be used to derive the formula. Or, for example, parameters obtained from a single camera can be used to determine the offset formula.

In one embodiment, $\Phi$ can be a phase offset equivalent to the angle between the accelerometer module and the camera module.

In one embodiment, the baseline for calculating the offset is the focuser range and trajectory when the angle between the optical axis of the camera and the gravity vector is zero. In FIG. 6, this corresponds to the camera face up position. Accordingly, when the camera is in a face up position, no offset would be required. In different embodiments, however, different baselines can be used to establish the common reference coordinate system.

In one embodiment, the offset would be a displacement on the x-axis to normalize the displacement curve for all possible camera orientations to the 0° displacement curve 670 as shown in FIG. 6 (where the 0° displacement curve 670 is being used as a baseline). Using the offset formula above then, the displacement of the end points for any given camera orientation from the reference 0° displacement curve 670 can easily be calculated. For example, in FIG. 6, the offset when the camera module is 180° out of phase with the gravity vector will be given by value 695. Further, the offset when the camera module is 90° out of phase with the gravity vector will be given by value 696.

Importantly, using the offset value, the end points on the displacement curve can be determined readily for any given camera orientation. Characterizing the end points allows the AF procedure to easily direct the focusing operation back into the active region of the displacement curve instead of getting stuck in the dead zones.

Figure 7:
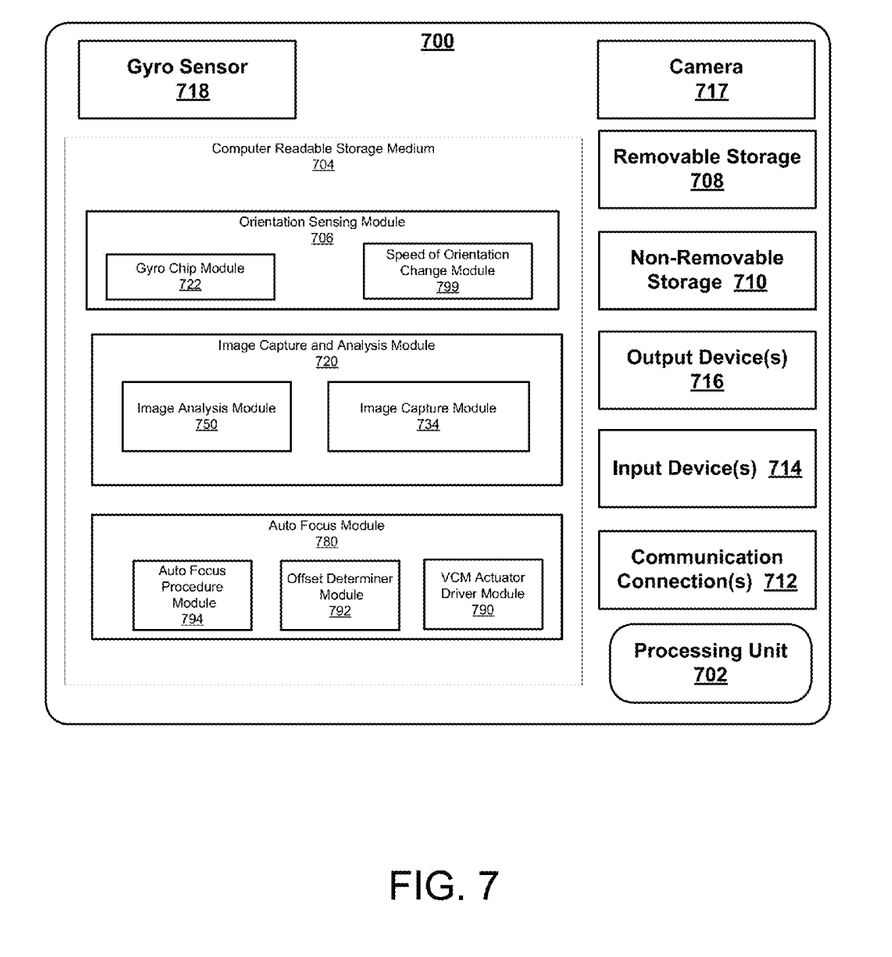
FIG. 7 is a block diagram of an exemplary computer system and illustrates the various hardware and software components with the orientation sensing module and auto-focusing module for a portable mobile device, in accordance with one embodiment of the present invention.

FIG. 7 is a block diagram of an exemplary computer system and illustrates the various hardware and software components with the orientation sensing module and auto-focusing module for a portable mobile device, in accordance with one embodiment of the present invention.

FIG. 7 shows a block diagram of an exemplary computing system environment 700, in accordance with one embodiment of the present invention. With reference to FIG. 7, an exemplary system module for implementing embodiments includes a general purpose computing system environment, such as computing system environment 700. Computing system environment 700 may include, but is not limited to, laptops, tablet PCs, notebooks, mobile devices, and smart phones. In its most basic configuration, computing system environment 700 typically includes at least one processing unit 702 and computer readable storage medium 704. Depending on the exact configuration and type of computing system environment, computer readable storage medium 704 may be volatile (such as RAM), non-volatile (such as ROM, flash memory, etc.) or some combination of the two. Portions of computer readable storage medium 704 when executed facilitate image or video capture.

Additionally, computing system environment 700 may also have additional features/functionality. For example, computing system environment 700 may also include additional storage (removable and/or non-removable) including, but not limited to, magnetic or optical disks or tape. Such additional storage is illustrated in FIG. 7 by removable storage 708 and non-removable storage 710. Computer storage media includes volatile and nonvolatile, removable and non-removable media implemented in any method or technology for storage of information such as computer readable instructions, data structures, program modules or other data. Computer readable medium 704, removable storage 708 and non-removable storage 710 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing system environment 700. Any such computer storage media may be part of computing system environment 700.

Computing system environment 700 may also contain communications connection(s) 712 that allow it to communicate with other devices. Communications connection(s) 712 is an example of communication media. Communication media typically embodies computer readable instructions, data structures, program modules or other data in a modulated data signal such as a carrier wave or other transport mechanism and includes any information delivery media. The term computer readable media as used herein includes both storage media and communication media.

Communications connection(s) 712 may allow computing system environment 1000 to communication over various networks types including, but not limited to, fibre channel, small computer system interface (SCSI), Bluetooth, Ethernet, Wi-fi, Infrared Data Association (IrDA), Local area networks (LAN), Wireless Local area networks (WLAN), wide area networks (WAN) such as the internet, serial, and universal serial bus (USB). It is appreciated the various network types that communication connection(s) 712 connect to may run a plurality of network protocols including, but not limited to, transmission control protocol (TCP), internet protocol (IP), real-time transport protocol (RTP), real-time transport control protocol (RTCP), file transfer protocol (FTP), and hypertext transfer protocol (HTTP).

Computing system environment 700 may also have input device(s) 714 such as a keyboard, mouse, pen, voice input device, touch input device, remote control, etc. Output device(s) 716 such as a display, speakers, etc. may also be included. All these devices are well known in the art and are not discussed at length.

Computing system environment 700 can also have an orientation sensor 718 and a camera 717.

In one embodiment, computer readable storage medium 704 includes orientation sensing module 706. Orientation sensing module includes gyro chip module 722 which is operable to use orientation data from the gyro sensor 718 in order to determine the tilt angle of the camera module. Further, orientation sensing module 706 also comprises speed of orientation change module 799. This module monitors the rate of change of orientation to determine if it has crossed over a certain threshold. When the rate crosses over a predetermined threshold, the module sends a signal to the auto-focus module 780 to temporarily suspend the AF procedure.

In one embodiment, computer readable storage medium 704 also comprises image capture and analysis module 720. Image capture and analysis module is operable to use image capture module 734 to capture images from the camera 717 and image analysis module 750 to analyze the images. For example, image analysis module 750 can be used during the hill-climbing procedure explained above to perform the periodic measurements of the evaluation value while trying to find the peak or optimal focusing point. Image capture module 734 can be used to capture images once peak focus has been attained by auto focus module 780.

Auto-focus module 780 comprises auto-focus procedure module 794. In one embodiment, auto-focus procedure module 794 can implement a hill-climbing procedure. In different embodiment, auto-focus procedure module 794 can use a different method for finding the optimal focus position for the lens train. The offset determiner module 792 within auto-focus module 780 implements the procedure used to determine the offset to find the end positions on the displacement curve. The determiner module can, as discussed above, either use a formula or a look-up table to determine the offset to the respective end position for any given camera posture or orientation. Finally, the VCM actuator driver module 790 sends the signal to the VCM actuator driver, as discussed above, to adjust the lens position in accordance with the offset and the common reference coordinate system.

Figure 8:
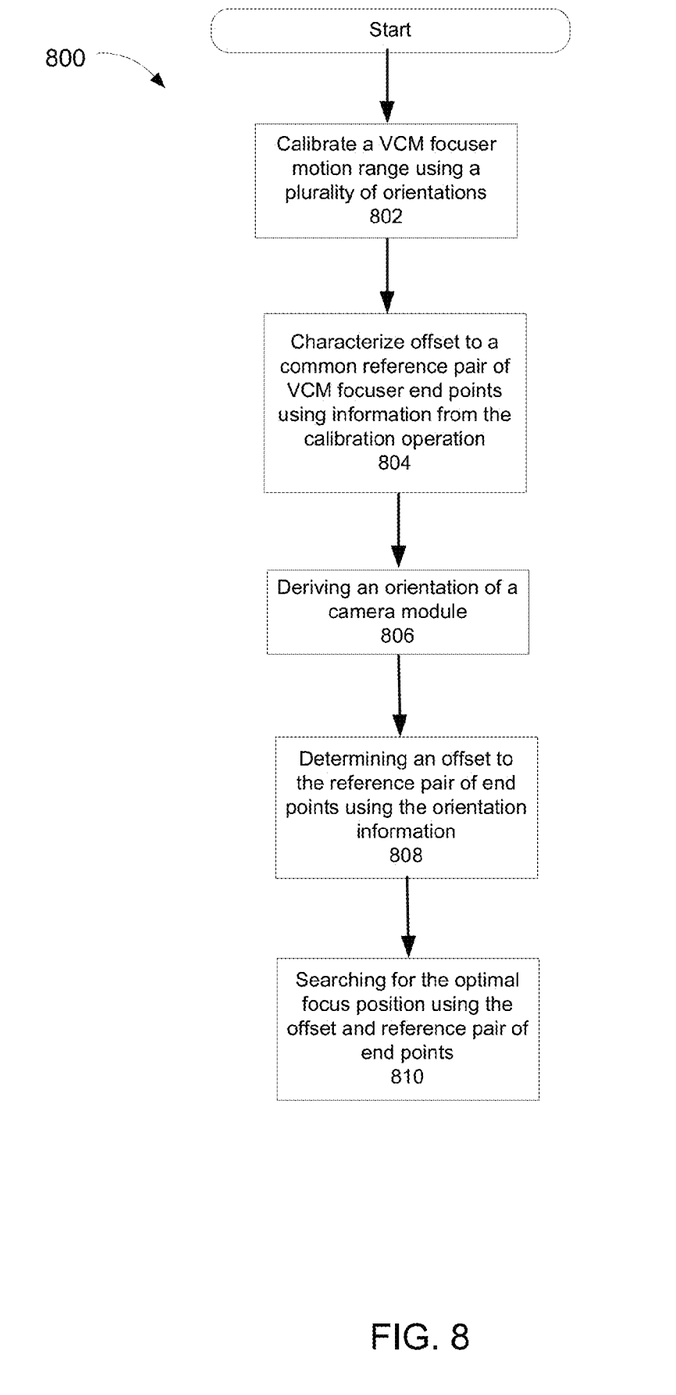
FIG. 8 depicts a flowchart of an exemplary computer controlled process of enhancing the auto-focusing performance of a camera in a portable electronic device based on orientation in accordance with one embodiment of the present invention.

FIG. 8 depicts a flowchart of an exemplary computer controlled process of enhancing the auto-focusing performance of a camera in a portable electronic device based on orientation in accordance with one embodiment of the present invention. The invention, however, is not limited to the description provided by flowchart 800. Rather, it will be apparent to persons skilled in the relevant art(s) from the teachings provided herein that other functional flows are within the scope and spirit of the present invention. Flowchart 800 will be described with continued reference to exemplary embodiments described above, though the method is not limited to those embodiments.

At step 802, the VCM focuser motion range and trajectory are calibrated under multiple postures and orientations and the results are saved in memory during regular camera and focus operations. The results of this calibration are then used to characterize an offset function, wherein the offset function is operable to provide an offset value to a common reference pair of VCM focuser end points. For example, as discussed above, the offset could be with respect to a pair of focuser end points on a displacement curve derived when the angle between the optical axis of the camera and the gravity vector is zero.

At step 806, before running the AF search procedure, the orientation for the camera is derived from the gyro chip module 722 as discussed above. Using the orientation information, the active region of lens movement for the orientation is determined by determining an offset to the reference pair of end points at step 808. Finally, the AF procedure can use the information regarding the offset and the reference pair of end points to perform the method, e.g., hill-climbing method, required to find the peak position of focus for the lens train.

Figure 9:
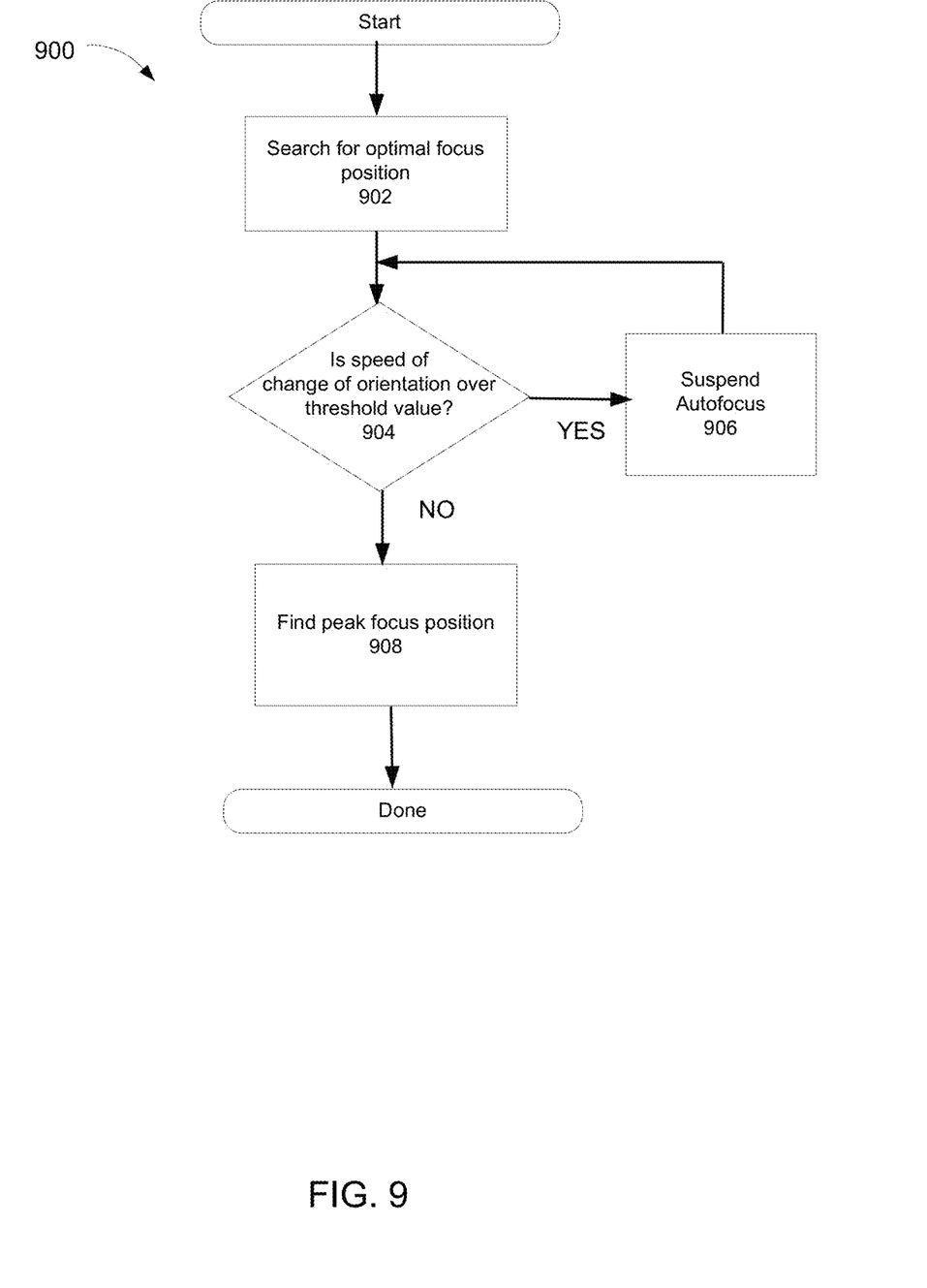
FIG. 9 depicts a flowchart of an exemplary computer controlled process of controlling the operation of the auto-focusing procedure in response to a speed of change in orientation in accordance with one embodiment of the present invention.

FIG. 9 depicts a flowchart of an exemplary computer controlled process of controlling the operation of the auto-focusing procedure in response to a speed of change in orientation in accordance with one embodiment of the present invention. The invention, however, is not limited to the description provided by flowchart 900. Rather, it will be apparent to persons skilled in the relevant art(s) from the teachings provided herein that other functional flows are within the scope and spirit of the present invention. Flowchart 900 will be described with continued reference to exemplary embodiments described above, though the method is not limited to those embodiments.

At step 902, the AF procedure searches for the peak point of focus, e.g. the AF procedure may be performing the hill-climbing method to find the peak as illustrated in graph 525 of FIG. 5. The speed of orientation change module 799 monitors the rate of change of orientation to determine if it has crossed over a predetermined threshold value at step 904 while the AF procedure is attempting to find the peak focus position.

If the rate cross over the threshold, then at step 906, the AF procedure is temporarily suspended. This allows the AF procedure to conserve power by suspending the AF procedure while the user is changing device orientation or otherwise moving the camera so that the image is not stable enough to adequately perform an AF operation.

If the rate has not crossed over the threshold, then at step 908, the AF procedure finds the focus peak and the AF operation is completed.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

The process parameters and sequence of steps described and/or illustrated herein are given by way of example only. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. These software modules may configure a computing system to perform one or more of the example embodiments disclosed herein. One or more of the software modules disclosed herein may be implemented in a cloud computing environment. Cloud computing environments may provide various services and applications via the Internet. These cloud-based services (e.g., software as a service, platform as a service, infrastructure as a service, etc.) may be accessible through a Web browser or other remote interface. Various functions described herein may be provided through a remote desktop environment or any other cloud-based computing environment.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

Embodiments according to the invention are thus described. While the present disclosure has been described in particular embodiments, it should be appreciated that the invention should not be construed as limited by such embodiments, but rather construed according to the below claims.

What is claimed is:

1. A method for camera focusing on a portable electronic device, said method comprising:
    determining an offset to a reference displacement range of a focuser within a camera module on said portable electronic device using information regarding an orientation of said camera module, wherein said reference displacement range is associated with a range of motion between a lens assembly and an image sensor at a reference camera orientation; and
    searching for a focus position for said focuser automatically using said offset and said reference displacement range.

2. The method of claim 1, wherein said searching is performed using a hill-climbing procedure.

3. The method of claim 1, wherein said reference camera orientation is associated with a posture wherein an angle between an optical axis of said camera module and gravity is zero.

4. The method of claim 1, wherein said determining comprises:
    calibrating a motion range for said focuser at a plurality of orientations; and
    characterizing an offset function using information from said calibrating, wherein said offset function is operable to determine an offset value from said reference displacement range for a range of orientations.

5. The method of claim 4, wherein said offset function is selected from a group consisting of: a formula and a look-up table.

6. The method of claim 1, wherein a component for performing said deriving is selected for said camera module from a group consisting of: a tri-axis accelerometer and a gyroscope.

7. The method of claim 1, further comprising:
    monitoring a rate of change of said orientation of said camera module; and
    suspending said searching procedure if said rate of change exceeds a predetermined threshold.

8. The method of claim 7, further comprising:
    reinitiating said searching procedure after said rate of change drops below said predetermined threshold.

9. The method of claim 1, wherein said focuser employs a voice coil motor.

10. A non-transitory computer-readable storage medium having stored thereon, computer executable instructions that, if executed by a computer system cause the computer system to perform a method for camera focusing on a portable electronic device, said method comprising:
    determining an offset to a reference displacement range of a focuser within a camera module on said portable electronic device using information regarding an orientation of said camera module, wherein said reference displacement range is associated with a range of motion between a lens assembly and an image sensor at a reference camera orientation; and
    searching for a focus position for said focuser automatically using said offset and said reference displacement range.

11. The computer-readable medium as described in claim 10, wherein said searching is performed using a hill-climbing procedure.

12. The computer-readable medium as described in claim 10, wherein said reference camera orientation is associated with a posture wherein an angle between an optical axis of said camera module and gravity is zero.

13. The computer-readable medium as described in claim 10, wherein said determining comprises:
    calibrating a motion range for said focuser at a plurality of orientations; and
    characterizing an offset function using information from said calibrating, wherein said offset function is operable to determine an offset value from said reference displacement range for a range of orientations.

14. The computer-readable medium as described in claim 13, wherein said offset function is selected from a group consisting of: a formula and a look-up table.

15. The computer-readable medium as described in claim 10, wherein a component for performing said deriving is selected for said camera module from a group consisting of: a tri-axis accelerometer and a gyroscope.

16. The computer-readable medium as described in claim 10, wherein said method further comprises:
    monitoring a rate of change of said orientation of said camera module; and
    suspending said searching procedure if said rate of change exceeds a predetermined threshold.

17. The computer-readable medium as described in claim 16, wherein said method further comprises:
    reinitiating said searching procedure after said rate of change drops below said predetermined threshold.

18. The computer-readable medium as described in claim 10, wherein said focuser employs a voice coil motor.

19. An electronic system comprising:
- a body;
- a bus;
- a camera module coupled to said bus and comprising an image sensor and a lens assembly wherein said lens assembly comprises a lens capable of being selectively moved to a distance from said image sensor for light focus thereon;
- an accelerometer coupled to said bus and configured to generate orientation information, said orientation information indicating contemporaneous orientation of said body with respect to a predetermined reference;
- a memory coupled to said bus; and
- a processor coupled to said bus, wherein said memory comprises instructions that when executed implement an autofocus program configured to automatically determine said distance based on: 1) image data captured by said camera module; and 2) said orientation information generated by said accelerometer, wherein said bus, said camera module, said accelerometer, said memory and said processor are integrated with said body.

20. An electronic system as described in claim 19 wherein said lens assembly comprises a lens movement mechanism for displacing said lens based on an input current signal and wherein further said autofocus program is configured to automatically determine an active range based on said orientation information wherein said active range defines a range over which a variation of said current leads to a variation of said distance.

21. An electronic system as described in claim 19 wherein said reference is a reference plane representing the ground.

22. An electronic system as described in claim 19 further comprising:
- a display screen coupled to said bus and configured to display information thereon; and
- a wireless phone module coupled to said bus and configured to provide cellular phone functionality.

23. An electronic system as described in claim 19 wherein said body is sized to be hand-held and portable.

* * * * *